(12) United States Patent
Holzer

(10) Patent No.: US 8,572,216 B2
(45) Date of Patent: Oct. 29, 2013

(54) SOCIAL NETWORK BUILDING

(75) Inventor: Michael L. Holzer, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1338 days.

(21) Appl. No.: 11/835,661

(22) Filed: Aug. 8, 2007

(65) Prior Publication Data
US 2009/0043872 A1 Feb. 12, 2009

(51) Int. Cl.
G06F 15/177 (2006.01)
H04W 24/00 (2009.01)

(52) U.S. Cl.
USPC ............ 709/220; 455/456.1; 455/550.1

(58) Field of Classification Search
USPC ............... 709/220; 455/456.1, 550.1
See application file for complete search history.

(56) References Cited

U.S. PATENT DOCUMENTS

| | | | |
|---|---|---|---|
| 6,442,263 B1 * | 8/2002 | Beaton et al. | 379/142.04 |
| 6,487,180 B1 * | 11/2002 | Borgstahl et al. | 370/310 |
| 2006/0166666 A1 * | 7/2006 | Roach, Jr. | 455/433 |
| 2006/0281407 A1 * | 12/2006 | Deeds | 455/41.2 |
| 2007/0021111 A1 * | 1/2007 | Celik | 455/418 |
| 2007/0130101 A1 * | 6/2007 | Anderson et al. | 707/1 |

* cited by examiner

Primary Examiner — Jungwon Chang
(74) Attorney, Agent, or Firm — James J. DeCarlo; Greenberg Traurig, LLP

(57) ABSTRACT

A portable electronic device is described that permits a user to easily share one or more network IDs with others, even when the user has an obscure, hard-to-remember network ID and/or a large number of different network IDs. A system, method and device is also described that permits a user to aggregate network IDs into different groups depending on the type of networking that the user is seeking to accomplish and to selectively share such groups of network IDs with other users. A system and method is further described that permits a user to easily obscure or otherwise control access to network IDs that have been designated for sharing with an intended recipient.

16 Claims, 13 Drawing Sheets

SOCIAL NETWORK BUILDING

BACKGROUND OF THE INVENTION

1. Field of the Invention

The invention generally relates to techniques for sharing network identifiers (IDs) associated with users, such as e-mail addresses or other IDs.

2. Background

In order for two people to interact online, each person must typically provide the other with a network identifier (ID). A network ID may be an e-mail address or any other ID that uniquely identifies a user within the context of a product, network, or service. For a variety of reasons, the process of exchanging network IDs has become a cumbersome one. One reason for this is that, as namespaces have become more crowded, the IDs available to users have become increasingly obscure. For example, a user named Jane Doe may be required to use an obscure network ID such as "janedoe2337@yahoo.com" because "janedoe@yahoo.com" and close variants thereof may already be in use. Such obscure network IDs are difficult to remember and therefore difficult to share with others.

Another reason that the process of exchanging network IDs has become cumbersome is that many users today have a variety of different network IDs. For example, it is not uncommon for a given user to have one or more personal e-mail addresses, a work-related e-mail address, and one or more network IDs corresponding to various business networking services (e.g., LinkedIn®, Ecademy™ or XING™) and/or social networking services (e.g., MySpace®, Facebook®, or Bebo®). It is often impossible for a user to remember each of these network IDs and therefore difficult to relate this information to others.

One potential solution to these issues surrounding sharing network IDs is for a user to carry a comprehensive list of all of his/her network IDs on a card that could be given to another person. However, such a card would need to be replaced each time the user added, deleted or modified a network ID. Furthermore, a user might not want to share all of his/her network IDs with another person. Rather, the user might want to share only a subset of his/her network IDs, such as only those network IDs associated with business networking services, or only those network IDs associated with social networking services. In this case, the user would need to carry a separate card for each possible subset of network IDs that he/she may wish to share. Once again, each of the separate cards would need to be replaced each time the user added, deleted or modified a network ID that was listed on the card. Such a solution to the issue of sharing network IDs is neither convenient nor practical.

Another issue related to the sharing of network IDs is that of blocking unwanted communications. For example, in the scenario described above, a user provides another person with a card that lists one or more of his/her network IDs. If the user later decide that he/she does not want to receive communications from the other person, the user must either have access to some sort of communication-blocking functionality for each of the shared network IDs or, absent such functionality, the user may be forced to change one or more of the shared network IDs. Furthermore, there is nothing to prevent the other person from sharing the network IDs with people or companies with whom the user would rather not interact.

What is needed, then, is a means by which a user can easily share one or more network IDs with others, even when the user has an obscure, hard-to-remember network ID and/or a large number of different network IDs. The desired means should preferably allow a user to aggregate network IDs into different groups depending on the type of networking that the user is seeking to accomplish (e.g., business networking vs. social networking) and to selectively share such groups of network IDs with other users. The desired means should also preferably provide a way for a user to easily obscure or otherwise control access to such network IDs by an intended recipient should the user decide at a later time that he/she does not wish to receive communications from the intended recipient or from another person or entity with whom the intended recipient might share such network IDs.

BRIEF SUMMARY OF THE INVENTION

A portable electronic device is described herein that permits a user to easily share one or more network IDs with others, even when the user has an obscure, hard-to-remember network ID and/or a large number of different network IDs. A system, method and device is also described herein that permits a user to aggregate network IDs into different groups depending on the type of networking that the user is seeking to accomplish (e.g., business networking vs. social networking) and to selectively share such groups of network IDs with other users. A system and method is further described herein that permits a user to easily obscure or otherwise control access to network IDs that have been designated for sharing with an intended recipient should the user decide at a later time that he/she does not wish to receive communications from the intended recipient or from another person or entity with whom the intended recipient might share such network IDs.

In particular, a portable electronic device is described herein that includes a memory and control logic coupled to the memory. The memory is configured to store one or more network identifiers associated with a first user. The control logic is configured to determine when the portable electronic device is capable of communicating with a second portable electronic device. The control logic is further configured to automatically transmit the one or more network identifiers associated with the first user to the second portable electronic device responsive to determining that the portable electronic device is capable of communicating with the second portable electronic device. The control logic may be further configured to automatically receive one or more network identifiers associated with a second user from the second portable electronic device responsive to determining that the portable electronic device is capable of communicating with the second portable electronic device.

The portable electronic device may further include a wireless network interface configured to wirelessly transmit the one or more network identifiers associated with the second user to a server for inclusion in a network contact list associated with the first user. Alternatively, the portable electronic device may further include a personal computer interface configured to transmit the one or more network identifiers associated with the second user to a personal computer.

The portable electronic device may also include location information acquisition logic. The location information acquisition logic is configured to obtain location information relating to a geographical location at which the one or more network identifiers associated with the second user were received. The control logic may be further configured to associate the location information with the one or more network identifiers associated with the second user.

The portable electronic device may additionally include network identifier selection logic. The network identifier selection logic is configured to select the one or more network identifiers associated with the first user from a plurality of groups of one or more network identifiers associated with the first user responsive to user input.

A method for sharing one or more network identifiers is also described herein. In accordance with the method, an obscuring identifier is associated with one or more network identifiers associated with a first user. The obscuring identifier is then provided to the first user in a format suitable for conveyance to a second user. Access is then granted to the second user to the one or more network identifiers responsive to receiving both the obscuring identifier from the second user and receiving an authorization message from the first user.

Providing the obscuring identifier to the first user in a format suitable for conveyance to a second user comprises may include, for example, wirelessly transmitting an electronic file to a portable device, transmitting an electronic file to a personal computer for subsequent downloading to a portable device, or providing the obscuring identifier in a format suitable for printing to a tangible medium. Granting access to the one or more network identifiers responsive to receiving both the obscuring identifier from the second user and receiving an authorization message from the first user may include generating an authorization request message for the first user and receiving an authorization response message from the first user.

A computer program product is also described herein. The computer program product includes a computer-readable medium having computer program logic recorded thereon for enabling a processing unit to share one or more network identifiers. The computer program logic includes first, second and third means. The first means are for enabling the processing unit to associate an obscuring identifier with one or more network identifiers associated with a first user. The second means are for enabling the processing unit to provide the obscuring identifier to the first user in a format suitable for conveyance to a second user. The third means are for enabling the processing unit to grant access to the second user the one or more network identifiers responsive to receiving both the obscuring identifier from the second user and receiving an authorization message from the first user.

The second means may include means for enabling the processing unit to wirelessly transmit an electronic file to a portable device, means for enabling the processing unit to transmit an electronic file to a personal computer for subsequent downloading to a portable device, or means for enabling the processing unit to provide the obscuring identifier in a format suitable for printing to a tangible medium. The third means may include means for enabling the processing unit to generate an authorization request message for the first user and means for enabling the processing unit to receive an authorization response message from the first user.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
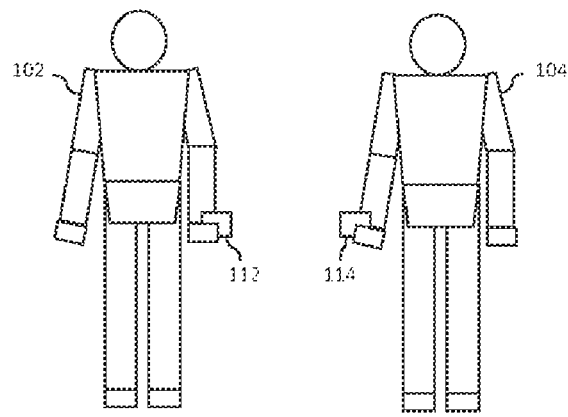
FIG. 1 is an illustration of a manner in which users may carry portable electronic devices that facilitate network ID sharing in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Portable Electronic Device for Network ID Sharing in Accordance with an Embodiment of the Present Invention One embodiment of the present invention is a portable electronic device that allows a user to carry and easily exchange network identifiers (IDs), such as e-mail addresses or other unique user IDs, with other users carrying like devices. A manner in which such portable electronic devices may be carried and used to exchange network IDs is illustrated in FIG. 1 and FIG. 2.

As shown in FIG. 1, a first user 102 is carrying a first portable electronic device 112 in accordance with an embodiment of the present invention while a second user 104 is carrying a second portable electronic device 114 in accordance with an embodiment of the present invention. First portable electronic device 112 includes a memory that stores one or more network IDs associated with first user 102. Second portable electronic device 114 includes a memory that stores one or more network IDs associated with second user 104. Each portable electronic device 112 and 114 is preferably small enough to enable a user to easily carry it on his/her person, although the device is not limited to a particular size.

Figure 2:
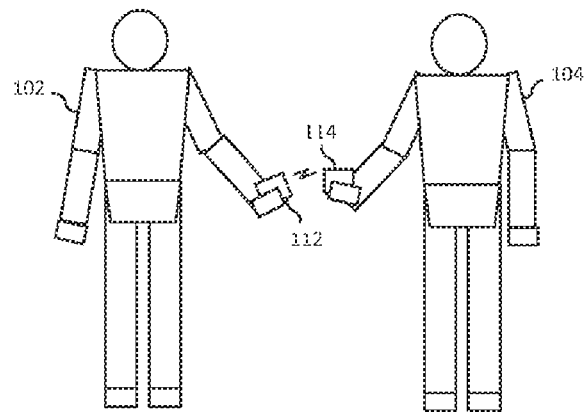
FIG. 2 is an illustration of a manner in which users may use portable electronic devices to exchange network IDs in accordance with an embodiment of the present invention.

As shown in FIG. 2, when first user 102 and second user 104 decide to exchange network IDs, the users bring their respective portable electronic devices within close proximity to permit wireless communication between the two devices. Upon determining that second portable electronic device 114 is close enough for wireless communication, first portable electronic device 112 automatically transfers the network ID(s) associated with first user 102 to second portable electronic device 114. Upon determining that first portable electronic device 112 is close enough for wireless communication, second portable electronic device 114 automatically transfers the network ID(s) associated with second user 104 to first portable electronic device 112. Depending on the implementation, the determination of whether the devices are sufficiently close for wireless communication may be made automatically by the devices themselves and/or in response to user input.

As will be appreciated by persons skilled in the relevant art(s), the proximity required for communication between first and second portable electronic devices 112 and 114 may depend upon the type of technology used to implement such communication. In one embodiment, the devices are configured such that they must actually be touching for the transfer to occur. In another embodiment in which infrared (IR) technology is used, IR transceivers associated with each device must be brought into line before the transfer may take place.

Each portable electronic device 112 and 114 stores the network ID(s) received from the other portable electronic device in memory. The received network ID(s) may then be uploaded at a later time to a server for inclusion in a contact list. Thus, first user 102 can add the received network ID(s) associated with second user 104 to his/her contact list and second user 104 can add the received network ID(s) associated with first user 102 to his/her contact list. The contact list may be associated with an application or service that is configured to use such network ID(s) for the purpose of communicating or otherwise interacting online. For example, the contact list may be associated with an e-mail or instant messaging application or service, although the invention is not so limited.

The forgoing approach to exchanging network IDs provides a distinct advantage over conventional methods of exchanging such information because each user need not remember or write down his/her own network ID(s) and/or the other user's network ID(s) in order to effectuate the exchange of information. This is particularly helpful where a user has an obscure, hard-to-remember network ID and/or a large number of different network IDs.

Persons skilled in the relevant art(s) will readily appreciate that the transfer of network IDs between first portable electronic device 112 and second portable electronic device 114 need not be bilateral in every instance. Rather, certain embodiments of the present invention also support unilateral transfers of one or more network IDs. In accordance with such embodiments, first portable electronic device 112 can transfer one or more network IDs to second portable electronic device 114 without receiving any network IDs in return and second portable electronic device 114 can transfer one or more network IDs to first portable electronic device 112 without receiving any network IDs in return.

Figure 6:
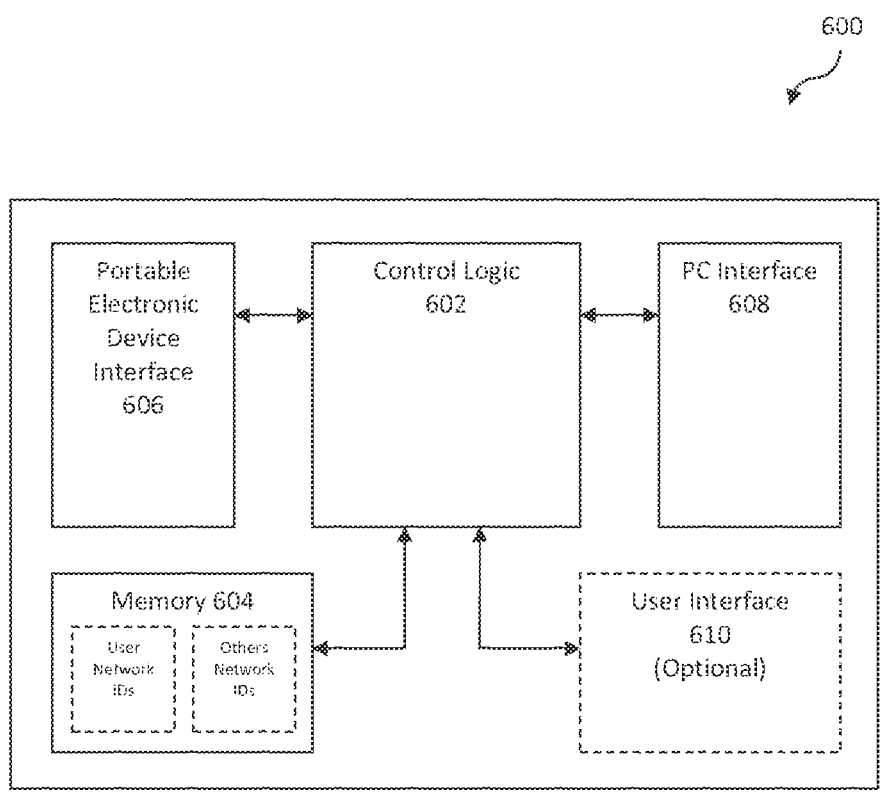
FIG. 6 is a block diagram of an example portable electronic device that includes a PC interface in accordance with an alternate embodiment of the present invention.
Figure 7:
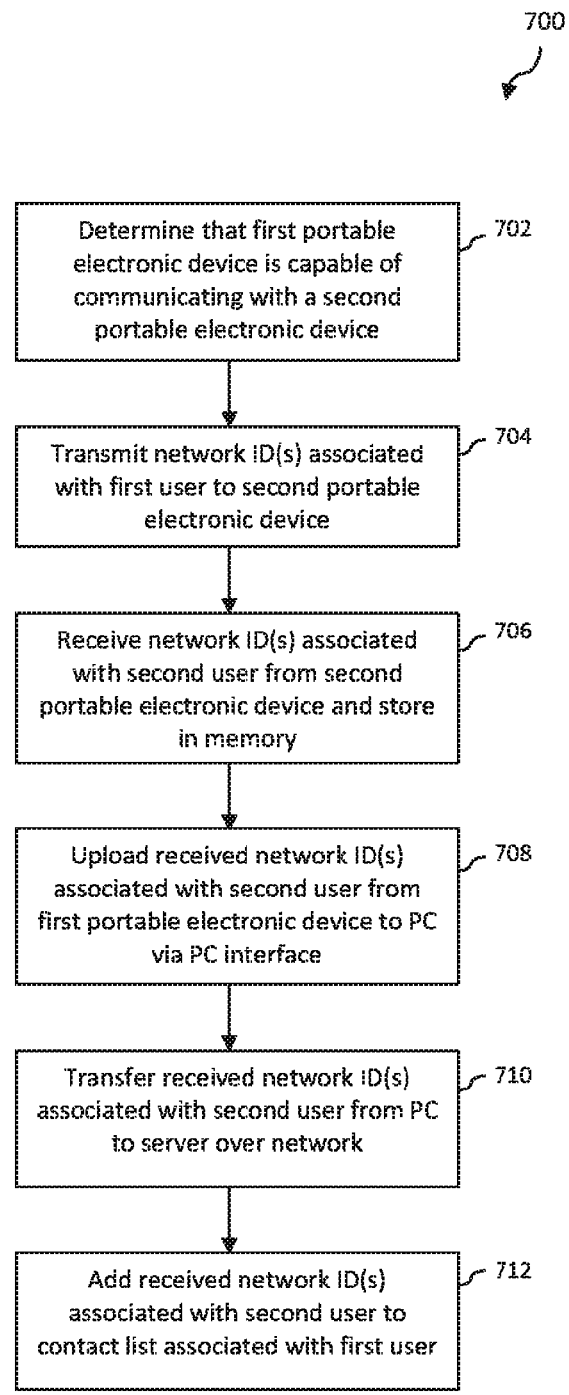
FIG. 7 depicts a flowchart of a method by which a portable electronic device may be used to share network IDs in accordance with an alternate embodiment of the present invention.
Figure 8:
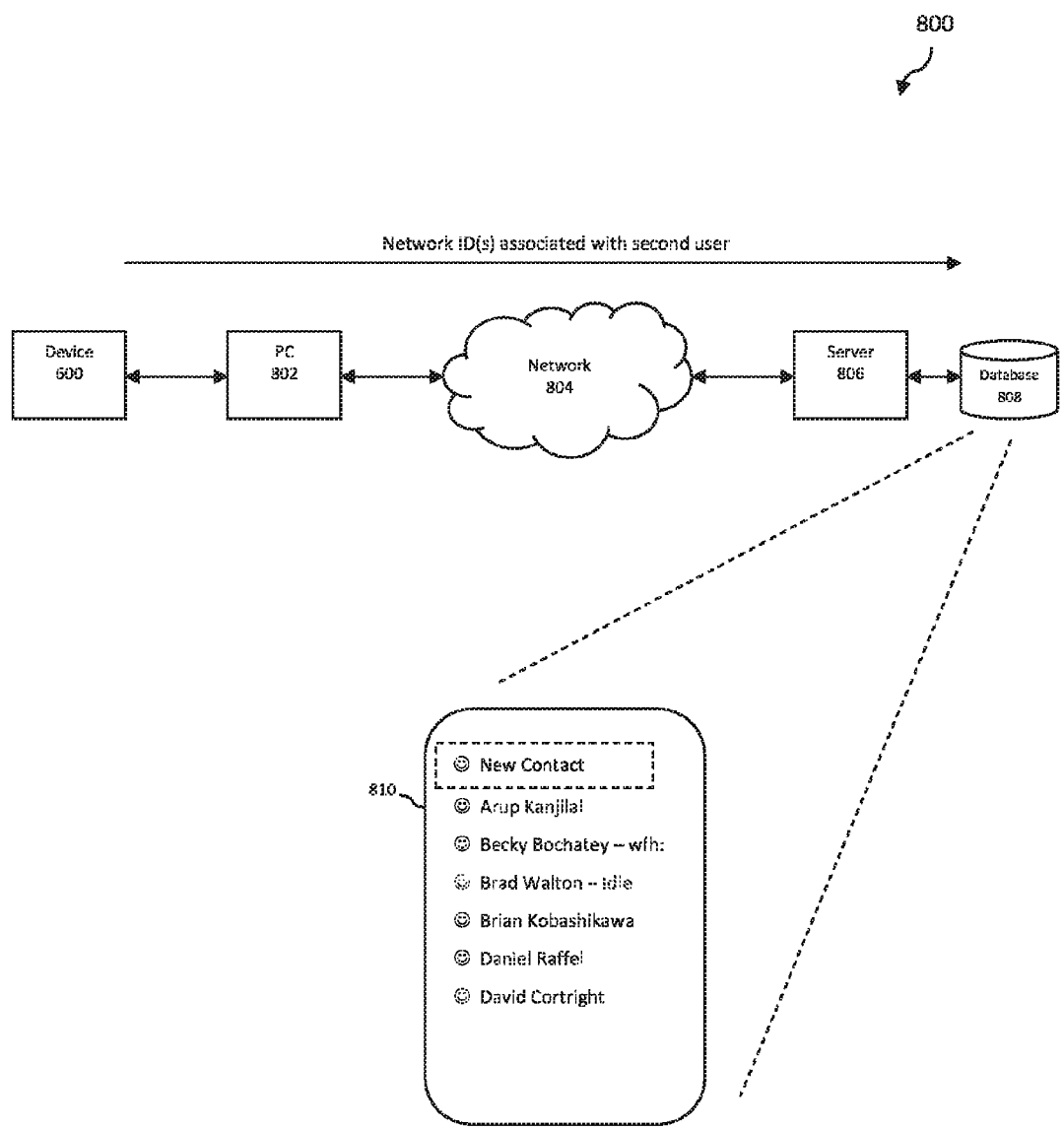
FIG. 8 is a block diagram of a system that illustrates one manner in which network IDs may be transferred from portable electronic device to a remote server via a PC in accordance with an embodiment of the present invention.
Figure 9:
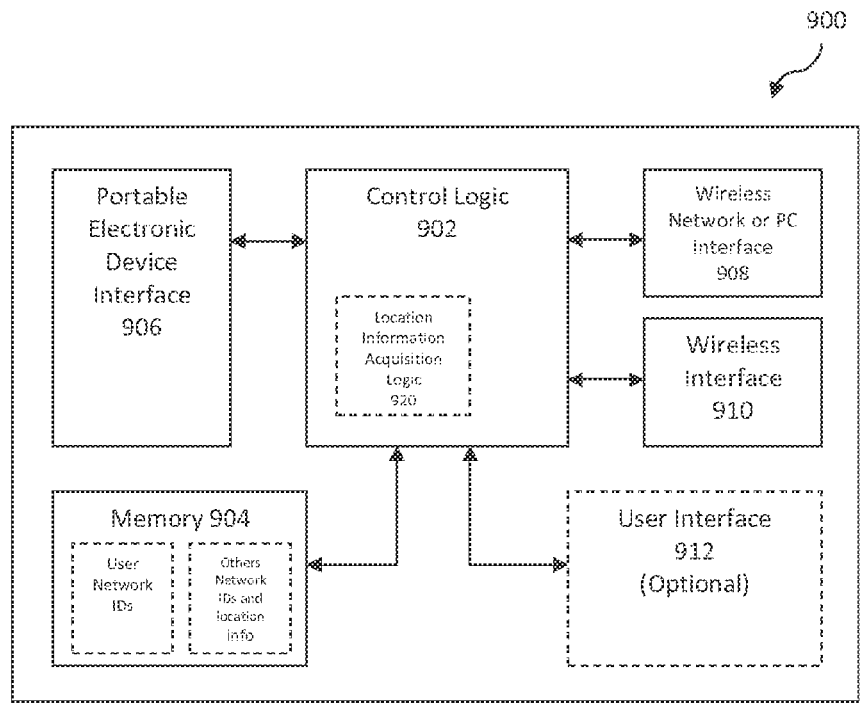
FIG. 9 is a block diagram of a portable electronic device that includes location information acquisition logic in accordance with an embodiment of the present invention.
Figure 10:
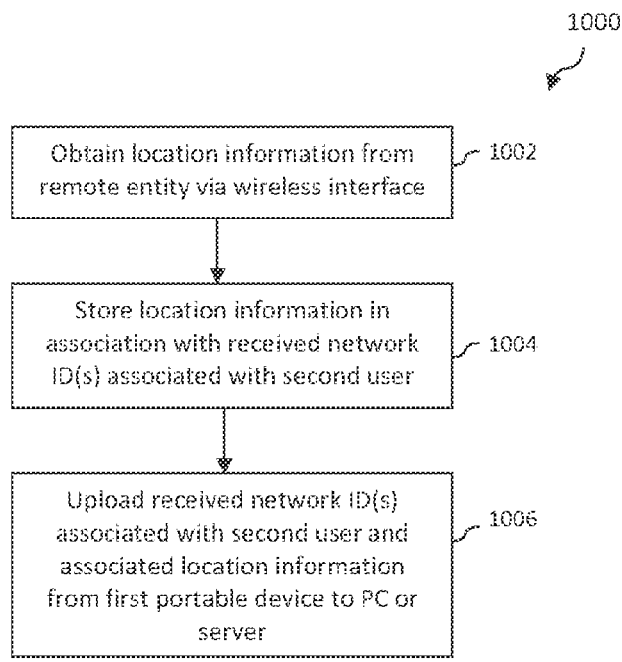
FIG. 10 depicts a flowchart of a method by which a portable electronic device may be used to obtain and associate location information with received network IDs in accordance with an embodiment of the present invention.
Figure 11:
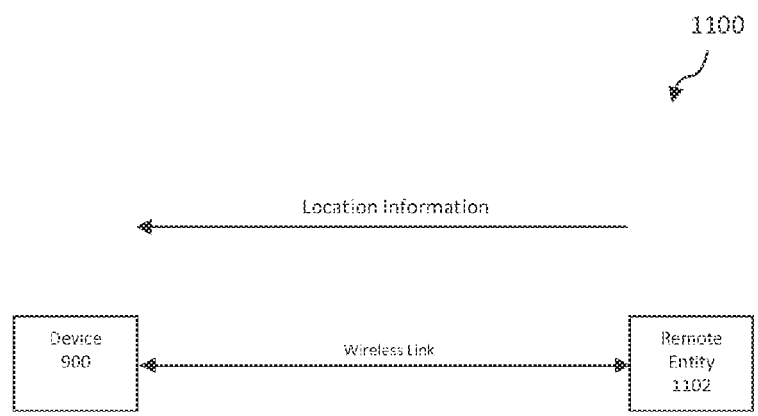
FIG. 11 is a block diagram of a system that illustrates one manner in which location information may be transferred from a remote entity to a portable electronic device in accordance with an embodiment of the present invention.

Different implementations of a portable electronic device that may be used in accordance with the present invention will now be described with reference to FIGS. 3-14. In particular, FIGS. 3-5 will be used to describe a portable electronic device that enables a user to directly upload received network IDs to a remote server over a wireless network. FIGS. 6-8 will be used to describe a portable electronic device that operates in conjunction with a personal computer (PC) to upload received network IDs to a remote server over the Internet. FIGS. 9-11 will be used to describe a portable electronic device that automatically acquires location information and associates it with received network IDs. Finally, FIGS. 12-14 will be used to describe a portable electronic device that allows a user to select between different network IDs stored on the device for sharing with other portable electronic devices.

1. Portable Electronic Device with Wireless Network Interface

Figure 3:
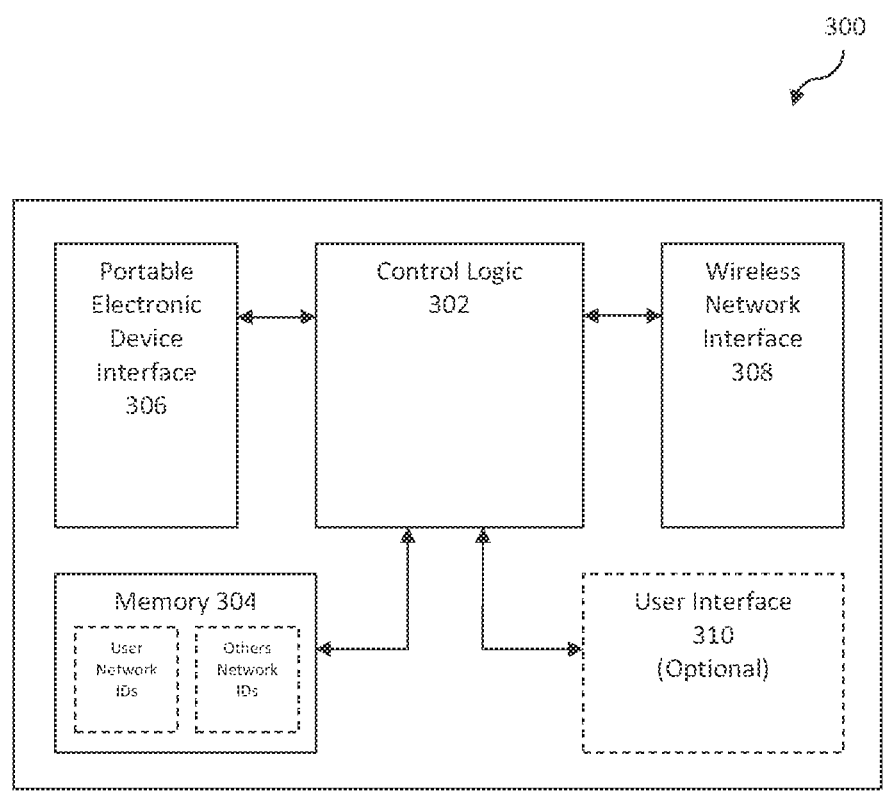
FIG. 3 is a block diagram of a portable electronic device that includes a wireless network interface in accordance with one embodiment of the present invention.

FIG. 3 is a block diagram of an example portable electronic device 300 in accordance with one embodiment of the present invention that includes a wireless network interface. As will be described in more detail herein, the wireless network interface allows portable electronic device 300 to directly upload received network IDs to a remote server over a wireless network.

As shown in FIG. 3, example portable electronic device 300 includes control logic 302, a memory 304, a portable electronic device interface 306, a wireless network interface 308, and an optional user interface 310. Each of these elements will now be described.

As shown in FIG. 3, control logic 302 is connected to each of memory 304, portable electronic device interface 306, wireless network interface 308, and optional user interface 310. Control logic 302 is configured to manage each of these blocks to perform features of the present invention as will be described in more detail herein. In one embodiment, control logic 302 is implemented entirely in hardware using analog and/or digital circuits. In an alternate embodiment, control logic 302 is implemented entirely in software, through the execution of stored instructions by an on-board processor. In a still further embodiment, control logic 302 is implemented as a combination of hardware and software.

Memory 304 is configured to store network IDs associated with the user of portable electronic device 300 for transfer to other portable electronic devices as well as to store network IDs associated with other users that are received from other portable electronic devices. Memory 304 may comprise any type of solid state read-write memory including but not limited to a random access memory (RAM), such as a static RAM (SRAM) or a dynamic RAM (DRAM), an electrically erasable programmable read only memory (EEPROM), a flash memory, or the like.

Portable electronic device interface 306 is a wireless interface that is configured to facilitate communication with other portable electronic devices for the purpose of transmitting and/or receiving network IDs. Portable electronic device interface 306 may be configured to transmit and receive information using any of a variety of well-known wireless communication technologies, including but not limited to technologies specifically designed for low power consumption, short-range wireless communication such as Bluetooth®, IR, or radio-frequency identification (RFID) technologies. Alternatively, portable electronic device interface 306 may be implemented using a proprietary radio frequency (RF) interface.

Wireless network interface 308 is an interface that is configured to facilitate wireless communication between portable electronic device 300 and a remote server for the purpose of uploading network IDs. Wireless network interface 308 may be configured to transmit and receive information using any of a variety of well-known wireless communication protocols, including but not limited to IEEE 802.11 ("WiFi"), IEEE 802.16 ("WiMax"), GSM (Global System for Mobile Communications), CDMA (Code Division Multiple Access), UMTS (Universal Mobile Telecommunication System), or fixed wireless data protocols. Alternatively, wireless network interface 308 may be implemented using a proprietary protocol.

Optional user interface 310 is an interface configured to receive input from a user of portable electronic device 300 and to output information thereto. For example, optional user interface 310 may include one or more buttons or pads for receiving input from a user and a screen for displaying information to the user. Alternatively, optional user interface 310 may include a touch-sensitive display that is configured to receive user input as well as to display information to the user.

Portable electronic device 300 may include additional features and functionality not depicted in FIG. 3. For example, portable electronic device 300 may be implemented as part of a mobile telephone, personal digital assistant (PDA), digital audio or multimedia player, or other handheld or mobile electronic device. In this case, portable electronic device 300 may be thought of as a multi-purpose device. Alternatively, portable electronic device 300 may include only such functionality as is necessary to perform the network ID sharing functions described herein. Persons skilled in the relevant art(s) will readily appreciate that the size, cost and power consumption of portable electronic device 300 will relate directly to the number of features and functions supported by the device. Thus, if a very slim, low-cost, low power consumption device is desired, less functionality should be included. However, if a variety of features and functions is desired, then it is to be expected that the device will be larger, more expensive, and consume more power.

A manner in which portable electronic device 300 may be used to share network ID(s) in accordance with an embodiment of the present invention will now be described with reference to flowchart 400 of FIG. 4. The steps of flowchart 400 are described herein by way of example only and are not intended to limit the present invention. Furthermore, although the steps of flowchart 400 are described herein with continued reference to portable electronic device 300, persons skilled in the relevant art(s) will readily appreciate that the method may be implemented using other devices or systems.

Figure 4:
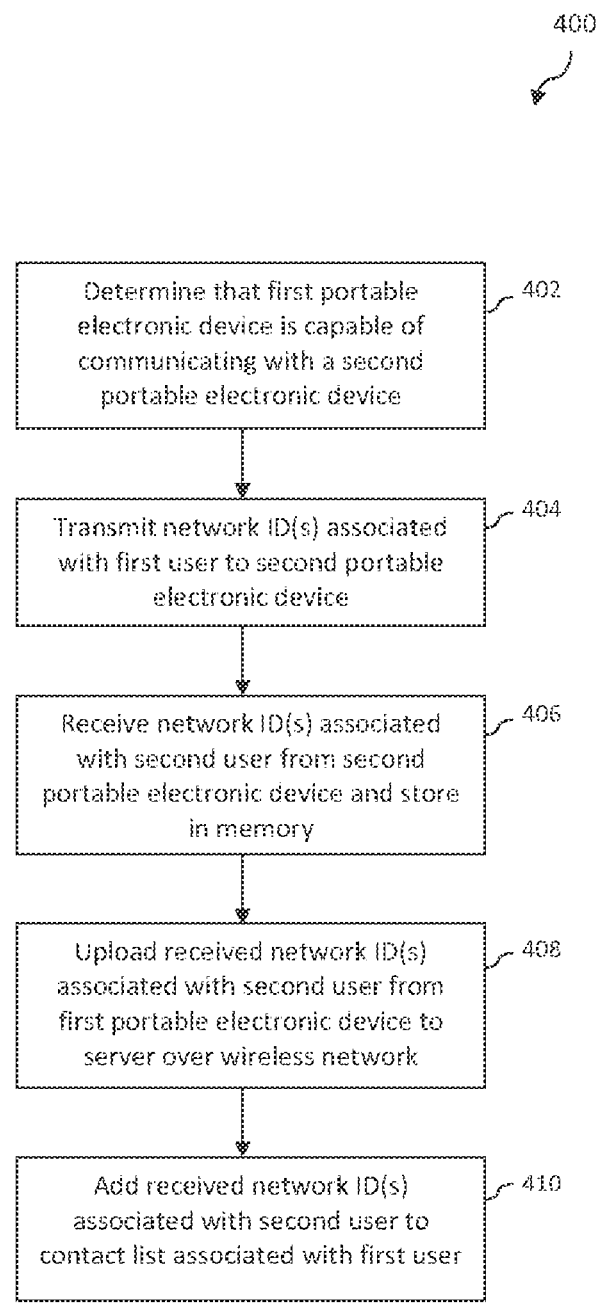
FIG. 4 depicts a flowchart of a method by which a portable electronic device may be used to share network IDs in accordance with an embodiment of the present invention.

As shown in FIG. 4, the method of flowchart 400 begins at step 402, in which control logic 302 determines that portable electronic device 300 (referred to in flowchart 400 as "first portable electronic device") is capable of communicating with a second portable electronic device. Control logic 302 may carry out this step by executing a wireless signaling protocol via portable electronic device interface 306. Such a protocol may be used to detect and establish wireless links to other portable electronic devices within a certain proximity of portable electronic device 300. Alternatively, control logic 302 may determine that communication with the second portable electronic device is feasible in response to receiving user input via optional user interface 310. In a still further embodiment, a combination of an established communication link and user input may be required before control logic 302 determines that portable electronic device 300 is capable of communicating with the second portable electronic device.

At step 404, control logic 302 obtains one or more network IDs associated with the first user from memory 304 and transmits the network ID(s) to the second portable device via portable electronic device interface 306.

At step 406, control logic 302 receives one or more network IDs associated with a second user from the second portable electronic device. These network ID(s) are received by control logic 302 via portable electronic device interface 306 and stored in memory 304.

At step 408, control logic 302 uploads the received network ID(s) associated with the second user from memory 304 to a remote server over a wireless network. Control logic 302 transfers the received network ID(s) over the wireless network via wireless network interface 308.

At step 410, the remote server adds the received network ID(s) associated with the second user to a contact list associated with the first user. The contact list may be associated with an application or service that is configured to use such network IDs for the purpose of communicating or otherwise interacting online. For example, the application or service may comprise an e-mail or instant messaging application or service, although the invention is not so limited.

Note that in an embodiment in which a unilateral exchange of network IDs is supported, either step 404 or steps 406, 408 and 410 of flowchart 400 may be omitted.

Figure 5:
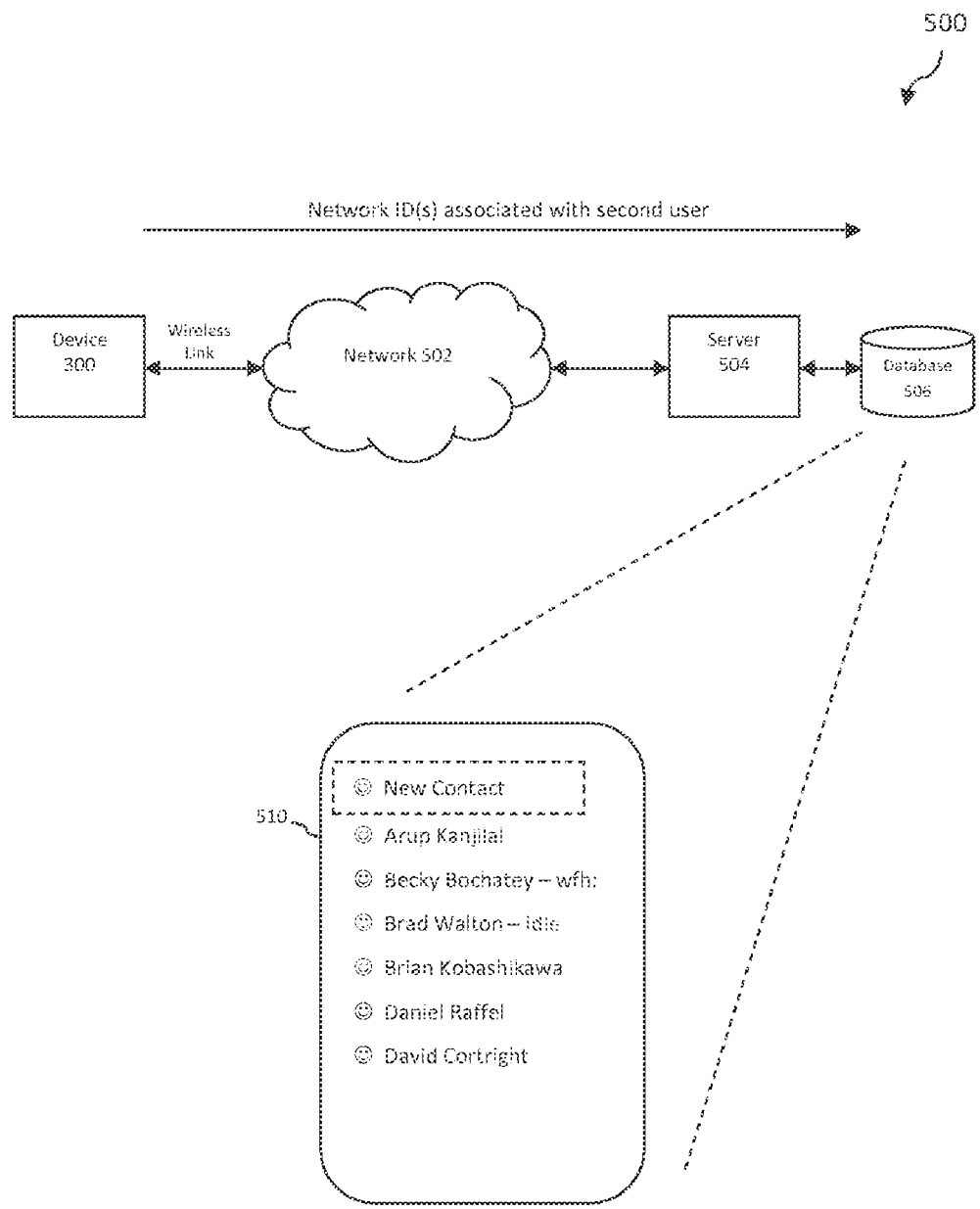
FIG. 5 is a block diagram of a system that illustrates one manner in which network IDs may be transferred from a portable electronic device to a remote server in accordance with an embodiment of the present invention.

FIG. 5 is a block diagram of a system 500 that illustrates one manner in which network IDs may be transferred from portable electronic device 300 to a remote server. As shown in FIG. 5, system 500 includes portable electronic device 300 in communication with a remote server 504 via a network 502. Portable electronic device 300 is connected to network 502 via a wireless link. The wireless link may be, for example, a link between portable electronic device 300 and a wireless access point or base station within network 502. Network 502 is in turn connected to server 504. As will be appreciated by persons skilled in the relevant art(s), network 502 may include both wired and wireless connections.

Remote server 504 is connected to a database 506. When remote server 504 receives the network ID(s) associated with the second user, it stores them in database 506 as part of a contact list 510 associated with the first user. As noted above, contact list 510 may be associated with an application or service that is configured to use such network IDs for the purpose of communicating or otherwise interacting online.

2. Portable Electronic Device with Personal Computer Interface

FIG. 6 is a block diagram of an example portable electronic device 600 in accordance with an alternate implementation of the present invention that includes a PC interface. As will be described in more detail herein, the PC interface allows portable electronic device 600 to upload received network IDs to a PC. The received network IDs are then transferred from the PC to a remote server over a network, such as the Internet.

As shown in FIG. 6, example portable electronic device 600 includes control logic 602, a memory 604, a portable electronic device interface 606, a PC interface 608, and an optional user interface 610. Control logic 602, memory 604, portable electronic device interface 606 and optional user interface 610 may be implemented in a similar to fashion to control logic 302, memory 304, portable electronic device interface 306 and optional user interface 310 of portable electronic device 300 of FIG. 3, respectively. The implementation details pertaining to these elements are provided above. However, unlike control logic 302 of portable electronic device 300, control logic 602 of portable electronic device 600 is configured to upload received network IDs to a PC via PC interface 608 rather than to a remote server via a wireless network interface.

PC interface 608 may be any type of wired or wireless interface that is configured for communication with a PC. For example, PC interface 608 may comprise a wired interface such as a RS-232 or a Universal Serial Bus (USB) interface. Alternatively, PC interface 608 may comprise a wireless interface such as a BlueTooth® interface or an IR interface. The IR interface may be configured for communication with a receiving device that resides in a port of a PC, such as in a USB port of a PC. However, these interface types are provided by way of example only and are not intended to limit the present invention.

Like portable electronic device 300, portable electronic device 600 may include other additional features and functionality not depicted in FIG. 6. For example, portable electronic device 600 may be implemented as part of a mobile telephone, PDA, digital audio or multimedia player, or other handheld or mobile electronic device. Alternatively, portable electronic device 600 may include only such functionality as is necessary to perform the network ID sharing functions described herein.

A manner in which portable electronic device 600 may be used to share network IDs in accordance with an embodiment of the present invention will now be described with reference to flowchart 700 of FIG. 7. The steps of flowchart 700 are described herein by way of example only and are not intended to limit the present invention. Furthermore, although the steps of flowchart 700 are described herein with continued reference to portable electronic device 600, persons skilled in the relevant art(s) will readily appreciate that the method may be implemented using other devices or systems.

As shown in FIG. 7, the method of flowchart 700 begins at step 702, in which control logic 602 determines that portable electronic device 600 (referred to in flowchart 700 as "first portable electronic device") is capable of communicating with a second portable electronic device. For example, control logic 602 may make this determination by executing a wireless signaling protocol via portable electronic device interface 606, in response to receiving user input via optional user interface 610, or in response to establishing a communication link and receiving user input.

At step 704, control logic 602 obtains one or more network IDs associated with the first user from memory 604 and transmits the network ID(s) to the second portable device via portable electronic device interface 606.

At step 706, control logic 602 receives one or more network IDs associated with a second user from the second portable electronic device. These network ID(s) are received by control logic 602 via portable electronic device interface 606 and stored in memory 604.

At step 708, control logic 602 uploads the received network ID(s) associated with the second user from memory 604 to a PC via PC interface 608.

At step 710, an application program executing on the PC transfers the received network ID(s) associated with the second user to a remote server over a network, such as the Internet.

At step 712, the remote server adds the received network ID(s) associated with the second user to a contact list associated with the first user. As noted above, the contact list may be associated with an application or service that is configured to use such network IDs for the purpose of communicating or otherwise interacting online.

Note that in an embodiment in which a unilateral exchange of network ID(s) is supported, either step 704 or steps 706, 708, 710 and 712 of flowchart 700 may be omitted.

FIG. 8 is a block diagram of a system 800 that illustrates one manner in which network IDs may be transferred from portable electronic device 800 to a remote server via a PC. As shown in FIG. 8, system 800 includes portable electronic device 600 in communication with a PC 802, which in turn is in communication with a remote server 806 via a network 804. Portable electronic device 600 is connected to PC 802 via PC interface 608. PC 802 is connected to network 804 via any of a variety of well-known mechanisms for connecting a PC to a network. Network 804 is in turn connected to server 806. In an embodiment, network 804 includes the Internet.

When an application executing on PC 802 receives the network ID(s) associated with the second user, it transfers them via network 804 to remote server 806. Remote server 806 is connected to a database 808. When remote server 806 receives the network ID(s) associated with the second user, it stores them in database 808 as part of a contact list 810 associated with the first user. As noted above, contact list 810 may be associated with an application or service that is configured to use such network IDs for the purpose of communicating or otherwise interacting online.

3. Portable Electronic Device with Location Information Acquisition Functionality FIG. 9 is a block diagram of a portable electronic device 900 that includes location information acquisition logic in accordance with an embodiment of the present invention. As will be described in more detail herein, the location information acquisition logic allows portable electronic device 900 to automatically acquire information related to the geographical location at which a transfer of network ID(s) from another device occurs and to associate such location information with received network ID(s). This location information can then be used to provide certain services to a user that exploit the association between the location information and the received network ID(s).

As shown in FIG. 9, example portable electronic device 900 includes control logic 902, a memory 904, a portable electronic device interface 906, a wireless network or PC interface 908, and an optional user interface 912. In one embodiment, these elements of portable electronic device 900 are implemented in a like manner to the elements of portable electronic device 300 described above in reference to FIG. 3, such that portable electronic device 900 can upload received network IDs to a remote server via a wireless network interface 908. In an alternate embodiment, these elements of portable electronic device 900 are implemented in a like manner to the elements of portable electronic device 600 described above in reference to FIG. 6, such that portable electronic device 900 can upload received network IDs to a PC via a PC interface 908.

As further shown in FIG. 9, portable electronic device 900 also includes a wireless interface 910 and location information acquisition logic 920 within control logic 902. Location information acquisition logic 920 is configured to use wireless interface 910 to obtain information related to the geographical location at which a transfer of one or more network IDs from another portable electronic device occurs. Wireless interface 910 may be, for example, a Bluetooth® or IEEE 802.11 interface although the invention is not limited to any particular interface type.

Control logic 902 is configured to store such location information in memory 904 in association within the network ID(s) received during the transfer. Control logic 902 is further configured to upload the location information along with the received network ID(s) when transferring the received network ID(s) to a remote server or to a PC for subsequent transmission to a remote server. This location information can then be used to provide certain services to a user that exploit the association between the location information and the received network ID(s).

In an alternate embodiment of the present invention, location information acquisition logic 920 acquires location information using the same wireless network interface 908 that is used by control logic 902 to upload received network IDs to a remote server. In accordance with such an embodiment, wireless interface 910 is not included within portable electronic device 900 as it is not necessary. In a further alternate embodiment of the present invention, location information acquisition logic 920 acquires location information using a Global Positioning System (GPS) unit that is included within portable electronic device 900. In accordance with this embodiment, wireless interface 910 is also not included within portable electronic device 900.

A manner in which portable electronic device 900 may be used to obtain and associate location information with received network IDs in accordance with an embodiment of the present invention will now be described with reference to flowchart 1000 of FIG. 10. The steps of flowchart 1000 are described herein by way of example only and are not intended to limit the present invention. Furthermore, although the steps of flowchart 1000 are described herein with continued reference to portable electronic device 900, persons skilled in the relevant art(s) will readily appreciate that the method may be implemented using other devices or systems.

As shown in FIG. 10, the method of flowchart 1000 begins at step 1002, in which location information acquisition logic 920 obtains location information from a remote entity via wireless interface 910 (or alternately, wireless network interface 908). The location information may comprise, for example, GPS coordinates. The remote entity may comprise a Wi-Fi device, a satellite switch, a router, a modem, or any other entity capable of storing and/or providing location information. In an alternate embodiment (not shown in FIG. 9), the location information is obtained from a GPS unit embedded within device 900 itself.

The location information obtained in step 1002 may be obtained on an ongoing basis (provided a source of such information is available) or only during or around the time in which a transfer of network ID(s) is occurring.

At step 1004, control logic 902 stores location information obtained in step 1002 in memory 904 in association with one or more received network IDs associated with a second user. In an embodiment in which location information is obtained on an ongoing basis, the location information may be matched to the received network ID(s) by comparing a GPS time obtained with the location information to the time at which the network ID(s) were received. In an embodiment in which location information is obtained only during or around the time in which a transfer of network ID(s) is occurring, the location information may be matched directly to the network ID(s) received during the transfer.

At step 1006, control logic 902 uploads the received network ID(s) and associated location information to a remote server or to a PC for subsequent transmission to a remote server. This step occurs via wireless network or PC interface 908. The location information can then be used to provide certain services to a user that exploit the association between the location information and the received network ID(s).

For example, the location information may be used by an application or service to provide a user with information about the geographic location at which a network ID was received from a particular contact. Such information may include for example, an address or point of interest at or near the geographic location at which the network ID was received. Furthermore, the location information may be used in conjunction with a Web mapping service to illustrate where one or more contacts were met within the context of a viewable map. These features advantageously allow a user to recall where a particular contact was met by identifying the location where the contact's network ID(s) were received. This may be particularly useful in an instance where a user has met and received network ID(s) from a large number of users over a short period of time.

FIG. 11 is a block diagram of a system 1100 that illustrates one manner in which location information may be transferred from a remote entity to portable electronic device 900. As shown in FIG. 11, system 1100 includes portable electronic device 900 in communication with a remote entity 1104 via a wireless link 1102. Portable electronic device 900 is configured to receive location information, such as GPS coordinates, from remote entity 1104 via wireless link 1102. As noted above, wireless link 1102 may comprise a Bluetooth® or IEEE 802.11 wireless link, although the invention is not limited to a particular type of wireless link.

4. Portable Electronic Device with Selective Network ID Sharing

As discussed above, one or more network IDs associated with a user may be stored on a portable electronic device and then shared with another user carrying a like portable electronic device. In accordance with one embodiment of the present invention, the user provides his/her network ID(s) for storage on the portable electronic device by directly inputting the network ID(s) into the device via a user interface (such as optional user interface 310 of FIG. 3, optional user interface 610 of FIG. 6, or optional user interface 912 of FIG. 9). In an alternate embodiment in which the portable electronic device includes a wireless network interface (such as device 300 of FIG. 3), a user may download his/her network ID(s) to the device from a remote server via a wireless network. In a still further embodiment in which the portable electronic device includes a PC interface (such as device 600 of FIG. 6), a user may download his/her network ID(s) to the device from a PC.

When a user has multiple network IDs, the user may want to share only a subset of the multiple network IDs with another person. For example, a user might want to share only network IDs associated with his/her business persona, or only network IDs associated with his/her social persona. To facilitate this, a portable electronic device in accordance with an embodiment of the present invention includes network ID selection logic that allows a user to select a subset of his/her network IDs for sharing with another user.

Figure 12:
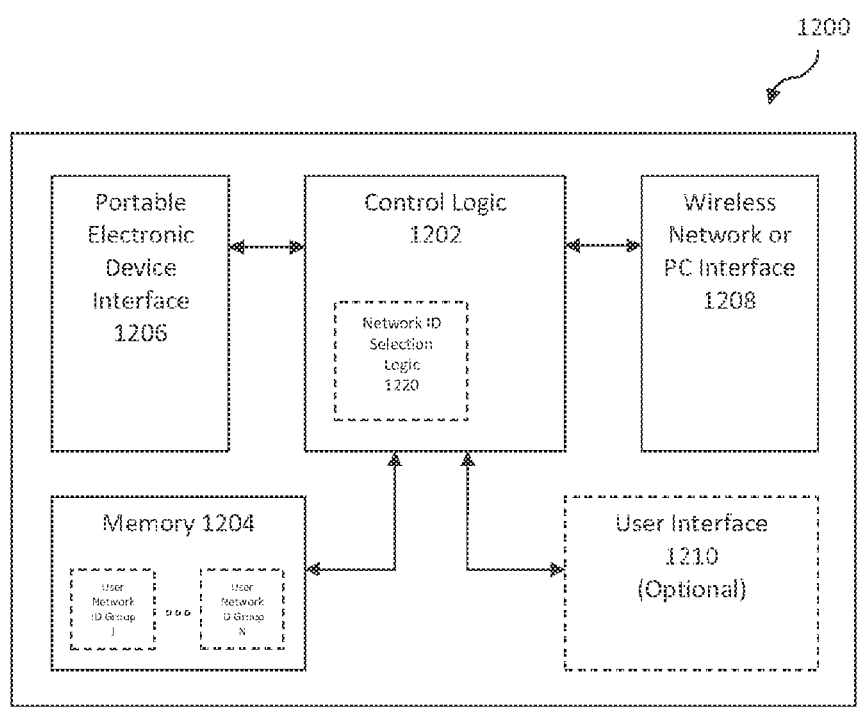
FIG. 12 is a block diagram of a portable electronic device that includes network ID selection logic that allows a user to select a subset of his/her network IDs for sharing with another user in accordance with an embodiment of the present invention.

Such an embodiment is depicted in FIG. 12. In particular, FIG. 12 depicts an example portable electronic device 1200 that includes control logic 1202, a memory 1204, a portable electronic device interface 1206, a wireless network or PC interface 1208, and an optional user interface 1210. In one embodiment, these elements of portable electronic device 1200 are implemented in a like manner to the elements of portable electronic device 300 described above in reference to FIG. 3, such that portable electronic device 1200 can upload received network IDs to a remote server via a wireless network interface 1208. In an alternate embodiment, these elements of portable electronic device 1200 are implemented in a like manner to the elements of portable electronic device 600 described above in reference to FIG. 6, such that portable electronic device 1200 can upload received network IDs to a PC via a PC interface 1208.

As further shown in FIG. 12, control logic 1202 of portable electronic device 1200 also includes network ID selection logic 1220. Network ID selection logic 1220 is configured to allow a user to select one or more network IDs from a set of multiple network IDs stored in memory 1204 of portable electronic device 1200 for sharing with another user carrying a like portable electronic device. For example, the multiple network IDs may be stored as N groups of one or more network IDs within memory 204, where N is any positive integer greater than 1. In further accordance with this example, a user may access network ID selection logic 1220 via user interface 1210 to select a first group of network IDs (e.g., "business persona" network IDs) for sharing with one person and then access network ID selection logic 1220 via user interface 1210 to select a second group of network IDs (e.g., "social persona" network IDs) for sharing with another person. Such logic allows a user to flexibly change the network IDs the user wishes to share with others carrying like device.

Network ID selection logic 1220 may be further configured to allow a user to use user interface 1210 to aggregate network IDs stored within memory 1204 into the various groups described above. In an alternate embodiment, the network IDs are stored in a remote database and portable electronic device 1200 is configured to execute a client application that communicates with a remote server for the purpose of aggregating and downloading groups of network IDs. In a still further embodiment, a PC executes a client application that communicates with a remote server for the purpose of aggregating and downloading groups of network IDs from the remote server to the PC. The groups of network IDs are then downloaded from the PC to the portable electronic device 1200.

Figure 13:
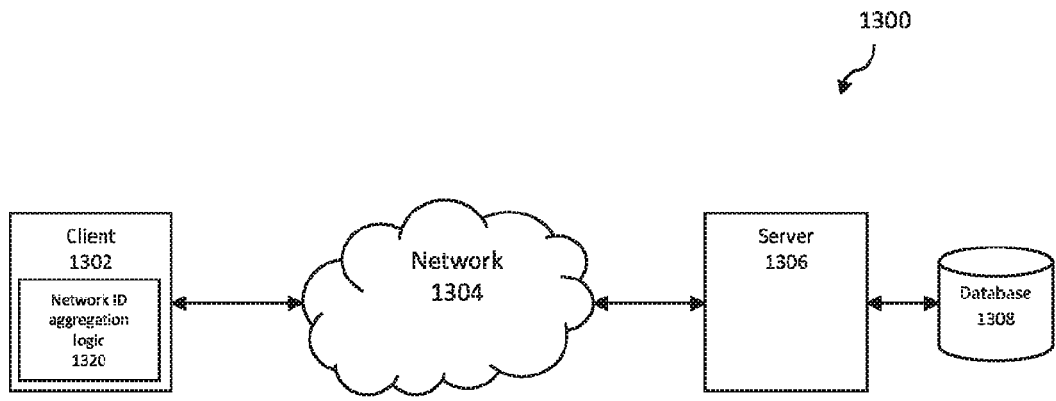
FIG. 13 is a block diagram of a client-server system that enables a user to aggregate network IDs stored in a remote database into groups for downloading to a portable electronic device or PC.

A client-server system that supports the two latter embodiments described in the preceding paragraph is shown in FIG. 13. In particular, FIG. 13 is a block diagram of a system 1300 that includes a client 1302, which may be a portable electronic device or a PC. Client 1302 is connected to a remote server 1306 via a network 1304. Client 1302 includes network ID aggregation logic 1320 that allows a user of client 1302 to access network IDs stored in a remote database 1308 via remote server 1306. Network aggregation logic 1320 is further configured to allow the user to organize the network IDs into groups and then download the groups to local storage. In an embodiment in which client 1302 is a portable electronic device (such as portable electronic device 1200), the groups of network IDs are downloaded into a memory within the portable electronic device. In an embodiment in which client 1302 is a PC, the groups of network IDs are downloaded into PC memory and then transferred from PC memory to a portable electronic device.

Figure 14:
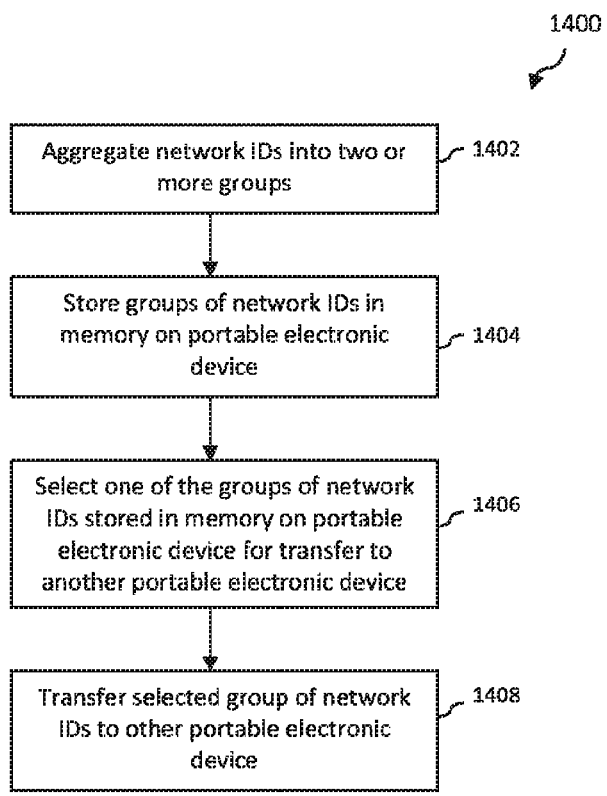
FIG. 14 depicts a flowchart of a method for selectively sharing groups of network IDs in accordance with an embodiment of the present invention.

FIG. 14 depicts a flowchart 1400 of a method for selectively sharing groups of network IDs in accordance with an embodiment of the present invention. The steps of flowchart 1400 are described herein by way of example only and are not intended to limit the present invention.

As shown in FIG. 14, the method of flowchart 1400 begins at step 1402, in which a user aggregates network IDs into two or more groups, wherein each group may itself include one or more network IDs. As discussed above, the aggregation function may be performed entirely by logic within a portable electronic device or by a client (such as a portable electronic device or PC) that operates in conjunction with a remote server.

At step 1404, the groups of network IDs that were aggregated in step 1402 are stored in memory on a portable electronic device. In certain embodiments, this step may include downloading the groups of network IDs to the portable electronic device from a remote server or PC.

At step 1406, a user selects one of the groups of network IDs stored in memory on the portable electronic device for transfer to another portable electronic device. With the respect to portable electronic device 1200 described above, this step may be achieved, for example, by accessing network ID selection logic 1220 via user interface 1219 to select a group of network IDs for transfer to another portable electronic device.

Finally, at step 1408, the selected group of network IDs is transferred to the other portable electronic device.

B. Obscured Network ID Sharing in Accordance with an Embodiment of the Present Invention Each of the embodiments of the present invention described above in Section A permits a user to easily transfer one or more of his/her network IDs to another person. There may be instances, however, where a user decides after providing the network ID(s) that he/she does not want to receive communications from the other person. In this instance, the user must either have access to some sort of communication-blocking functionality for each of the shared network IDs or, absent such functionality, the user may be forced to change one or more of the shared network IDs. Furthermore, in the embodiments of the present invention described in Section A, there is nothing to prevent the recipient of the user's network ID(s) from sharing the network ID(s) with other people or companies with whom the user would rather not interact.

This section will describe an alternate approach to sharing network IDs in accordance with an embodiment of the present invention that provides a way for a user to easily obscure or otherwise control access to his/her network ID(s) by an intended recipient should the user decide at a later time that he/she does not wish to receive communications from the intended recipient or from another person or entity with whom the intended recipient might share the network ID(s).

Figure 15:
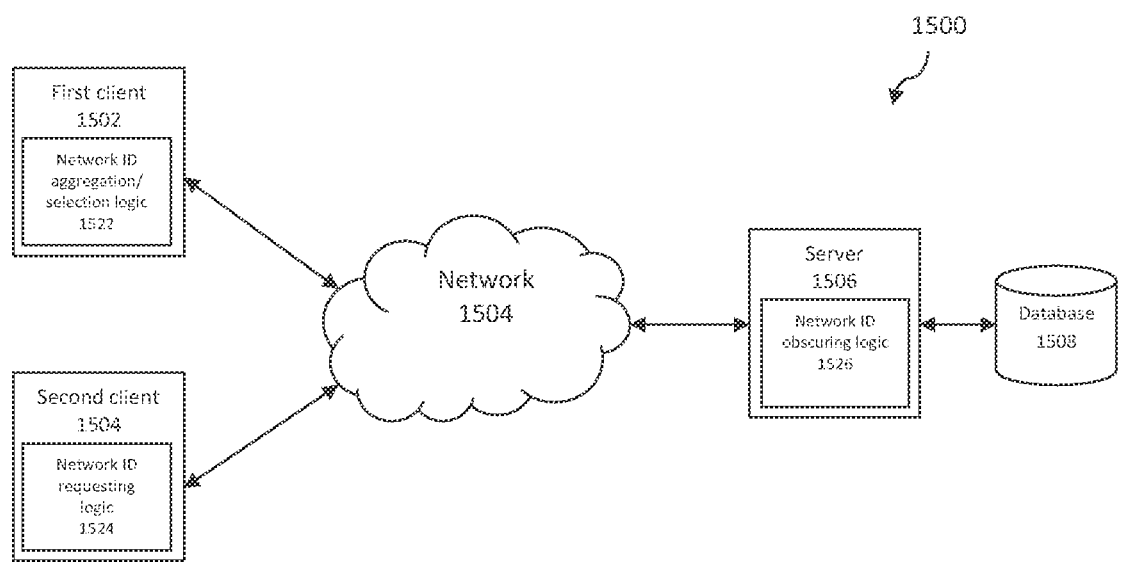
FIG. 15 is a block diagram of a system that permits a user to obscure one or more designated network IDs prior to sharing the designated network ID(s) with an intended recipient in accordance with an embodiment of the present invention.

The relevant approach will be described with reference to elements of a system 1500 depicted in FIG. 15, although persons skilled in the relevant art(s) will appreciate that the approach may be implemented using other systems. As shown in FIG. 15, system 1500 includes a first client 1502 in communication with a server 1506 over a network 1504 and a second client 1504 in communication with server 1506 over network 1504.

First client 1502 is used by a user seeking to share one or more of his/her network IDs (referred to in this section as the "first user"). First client 1502 may be a portable electronic device, PC, or any other type of device or system configurable to perform the functions of first client 1502 as will be described in more detail herein.

Second client 1504 is used by another user seeking to access network IDs shared by the first user (referred to in this section as the "second user"). Second client application 1504 may be a portable electronic device, PC, or any other type of device or system configurable to perform the functions of second client 1504 as will be described in more detail herein.

The operation of the elements of system 1500 will now be described with reference to flowchart 1600 of FIG. 16. The steps of flowchart 1600 are described herein by way of example only and are not intended to limit the present invention.

Figure 16:
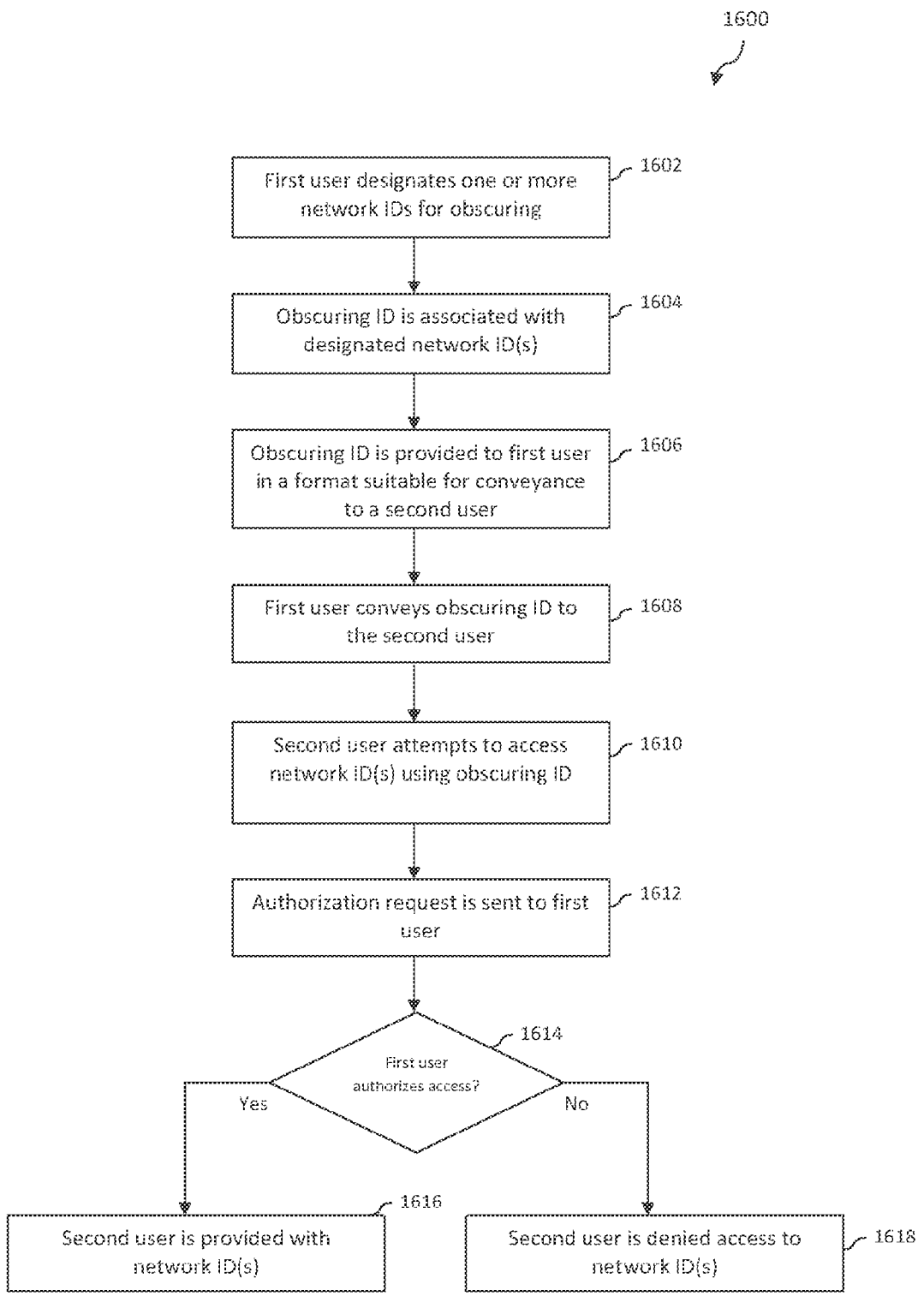
FIG. 16 is a flowchart of a method for obscuring one or more designated network IDs prior to sharing the designated network ID(s) with an intended recipient in accordance with an embodiment of the present invention.

As shown in FIG. 16, the method of flowchart 1600 begins at step 1602, in which the first user designates one or more of his/her network IDs for obscuring. In example system 1500, the first user's network IDs are stored in a remote database 1508. First client 1502 includes network ID aggregation/selection logic 1522 that operates in conjunction with server 1506 to permit the first user to organize his/her network IDs into groups and to select a group of network IDs for obscuring. Since a group may include one or more network IDs, a single network ID or multiple network IDs may be obscured.

At step 1604, an obscuring identifier (ID) is associated with the network ID(s) designated by the first user in step 1602. In example system 1500, server 1506 includes network ID obscuring logic 1526 for performing this function. An obscuring ID is any type of transferable descriptor that is uniquely associated with the designated network ID(s) but that does not comprise or include the network ID(s). The obscuring ID is generated in a manner such that server 1506 is capable of matching the obscuring ID to the designated network ID(s). However, the obscuring ID is also generated in a manner such that a person receiving the obscuring ID cannot use it to deduce the designated network ID(s) associated with it. The obscuring ID may be, for example, a random or pseudo-random sequence of number or characters that server 1506 generates and associates with the designated network ID(s). However, this is only one example, and other types of obscuring IDs and means for generating them may be used.

At step 1606, the obscuring ID generated in step 1604 is provided to the first user in a format suitable for conveyance to a second user. This step may include transferring an electronic version of the obscuring ID from server 1506 to client 1502. For example, client 1502 may be a portable electronic device similar to the portable electronic devices described above in Section A, except that the device is used to store and transfer obscuring IDs rather than network IDs. As a further example, client 1502 may be a PC that receives the obscuring ID and then transfers it to a portable electronic device for sharing with another user.

In an alternate embodiment, step 1606 comprises providing the first user with the obscuring ID in a manner that permits the first user to generate a card (e.g., a business card) that includes the obscuring ID. For example, step 1606 may include providing the first user with an electronic image (e.g., a TIF file, .PDF file, or the like) that can be printed by the first user to a business card or other suitable medium and then carried on his/her person.

At step 1608, the first user conveys the obscuring ID to the second user. In accordance with the foregoing examples, this step may include transferring an electronic version of the obscuring ID from a first portable electronic device to a second portable electronic device or may include transferring a business card or other printed medium from the first user to the second user. This step may broadly include other mechanisms for transferring the obscuring ID, including but not limited to sending the obscuring ID using conventional electronic communication tools such as e-mail or instant messaging, as well as orally reciting the obscuring ID.

At step 1610, the second user attempts to access the network ID(s) designated by the first user using the obscuring ID received during step 1608. With respect to example system 1500, the second user uses network ID requesting logic within second client 1504 to attempt to access the designated network ID(s). As part of this attempt, second client 1504 transfers the obscuring ID to server 1610.

At step 1612, an authorization request is sent to the first user responsive to the second user attempting to access the designated network ID(s). With respect to example system 1500, the authorization request may be sent from server 1506 to first client 1502. Alternatively, the authorization request may be sent from server 1506 to another system or device to which the first user has access. The authorization request may inform the first user that the second user would like to access the designated network ID(s) and may ask the first user whether the first user would like to permit such access.

At decision step 1614, responsive to receiving the authorization request, the first user either authorizes or denies access by the second user to the designated network ID(s). This step may include, for example, sending a message from first client 1502 to server 1506 indicating that access has either been authorized or denied by the first user. Alternatively or additionally, the failure of the first user to respond to the authorization request after a given period of time may be interpreted by server 1506 as a denial of access.

If at decision step 1614, the first user authorizes access by the second user to the designated network ID(s), then access to the designated network ID(s) is granted as shown at step 1616. This step may include, for example, providing the designated network ID(s) from server 1506 to second client 1504.

If, however, at decision step 1614, the first user does not authorize access by the second user to the designated network ID(s), then access to the designated network ID(s) is denied as shown at step 1618. Step 1618 may include, for example, sending a message from server 1506 to second client 1504 indicating that access to the designated network ID(s) has not yet been authorized or has been denied. Alternatively, step 1618 may simply include not responding to the access attempt by the second user.

In accordance with the foregoing method, the first user can invite the second user to access selected one or ones of his/her network IDs through the transfer of the obscuring ID. However, because the first user must authorize the subsequent access to the first user's network IDs and because the obscuring ID cannot be used by the second user to deduce the first user's network IDs, the first user is allotted a time period during which he/she can change his/her mind and decide not to share his/her network IDs with the second user.

C. Example Client/Server Implementations

The clients and servers discussed herein may each be implemented using any well-known processor-based computer system. An example of such a computer system 1700 is depicted in FIG. 17.

Figure 17:
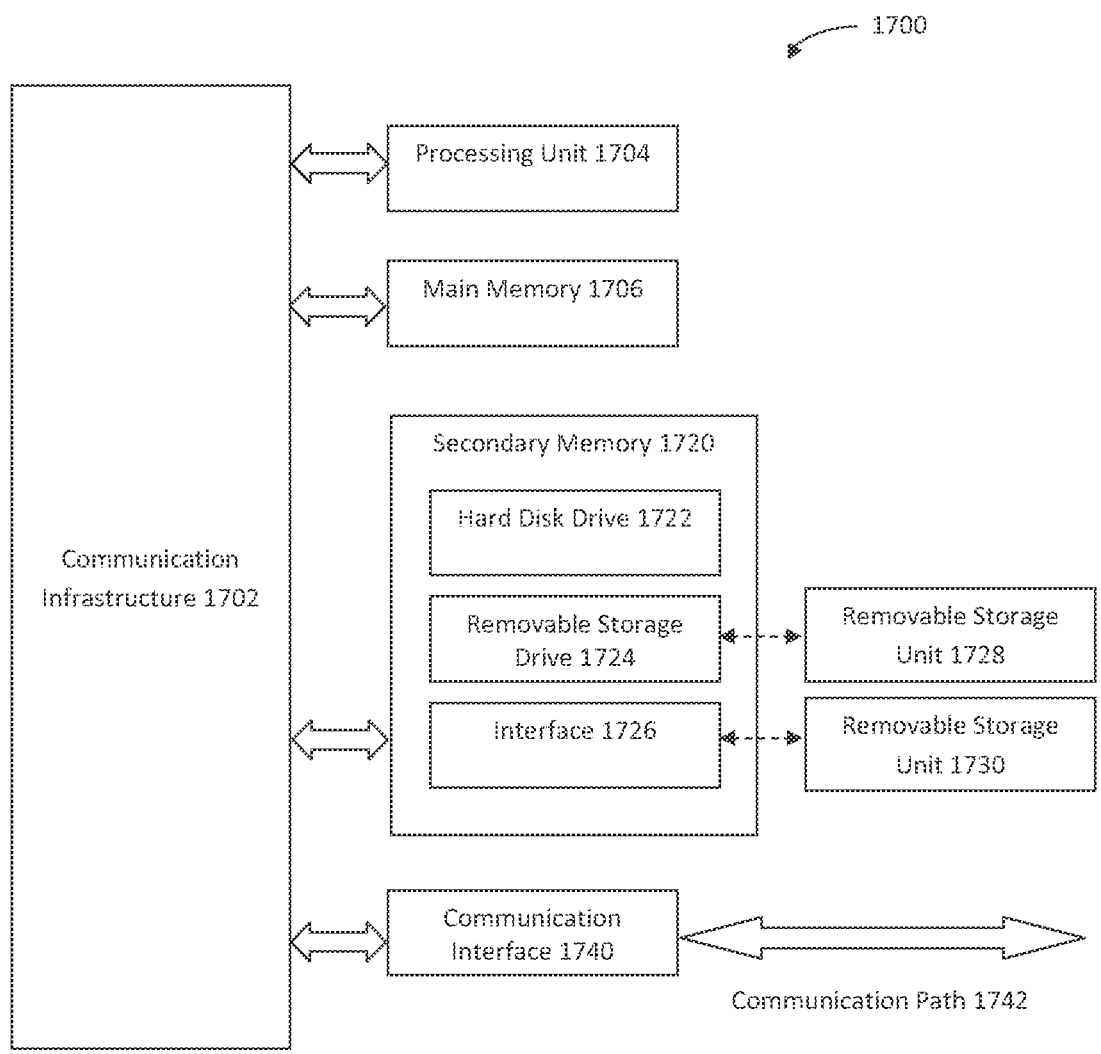
FIG. 17 is a block diagram of an example client or server in accordance with an embodiment of the present invention.

As shown in FIG. 17, computer system 1700 includes a processing unit 1704 that includes one or more processors. Processor unit 1704 is connected to a communication infrastructure 1702, which may comprise, for example, a bus or a network.

Computer system 1700 also includes a main memory 1706, preferably random access memory (RAM), and may also include a secondary memory 1720. Secondary memory 1720 may include, for example, a hard disk drive 1722, a removable storage drive 1724, and/or a memory stick. Removable storage drive 1724 may comprise a floppy disk drive, a magnetic tape drive, an optical disk drive, a flash memory, or the like. Removable storage drive 1724 reads from and/or writes to a removable storage unit 1728 in a well-known manner. Removable storage unit 1728 may comprise a floppy disk, magnetic tape, optical disk, or the like, which is read by and written to by removable storage drive 1724. As will be appreciated by persons skilled in the relevant art(s), removable storage unit 1728 includes a computer usable storage medium having stored therein computer software and/or data.

In alternative implementations, secondary memory 1720 may include other similar means for allowing computer programs or other instructions to be loaded into computer system 1700. Such means may include, for example, a removable storage unit 1730 and an interface 1726. Examples of such means may include a program cartridge and cartridge interface (such as that found in video game devices), a removable memory chip (such as an EPROM, or PROM) and associated socket, and other removable storage units 1730 and interfaces 1726 which allow software and data to be transferred from the removable storage unit 1730 to computer system 1700.

Computer system 1700 may also include a communications interface 1740. Communications interface 1740 allows software and data to be transferred between computer system 1700 and external devices. Examples of communications interface 1740 may include a modem, a network interface (such as an Ethernet card), a communications port, a PCM-CIA slot and card, or the like. Software and data transferred via communications interface 1740 are in the form of signals which may be electronic, electromagnetic, optical, or other signals capable of being received by communications interface 1740. These signals are provided to communications interface 1740 via a communications path 1742. Communications path 1742 carries signals and may be implemented using wire or cable, fiber optics, a phone line, a cellular phone link, an RF link and other communications channels.

As used herein, the terms "computer program medium" and "computer usable medium" are used to generally refer to media such as removable storage unit 1728, removable storage unit 1730, a hard disk installed in hard disk drive 1722, and signals received by communications interface 1740. Computer program medium and computer useable medium can also refer to memories, such as main memory 1706 and secondary memory 1720, which can be semiconductor devices (e.g., DRAMs, etc.). These computer program products are means for providing software to computer system 1700.

Computer programs (also called computer control logic, programming logic, or logic) are stored in main memory 1706 and/or secondary memory 1720. Computer programs may also be received via communications interface 1740. Such computer programs, when executed, enable the computer system 1700 to implement features of the present invention as discussed herein. Accordingly, such computer programs represent controllers of the computer system 1700. Where the invention is implemented using software, the software may be stored in a computer program product and loaded into computer system 1700 using removable storage drive 1724, interface 1726, or communications interface 1740.

The invention is also directed to computer program products comprising software stored on any computer useable medium. Such software, when executed in one or more data processing devices, causes a data processing device(s) to operate as described herein. Embodiments of the present invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, zip disks, tapes, magnetic storage devices, optical storage devices, MEMs, nanotechnology-based storage device, etc.), and communication mediums (e.g., wired and wireless communication networks, local area networks, wide area networks, intranets, etc.).

D. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A portable electronic device, comprising:
   a memory configured to store one or more network identifiers associated with a first user;
   control logic coupled to the memory, the control logic configured to determine when the portable electronic device is capable of communicating with a second portable electronic device, wherein determining when the portable electronic device is capable of communicating with the second portable electronic device comprises determining when the portable electronic device is sufficiently proximate to the second portable electronic device to support wireless communication therewith, to automatically transmit the one or more network identifiers associated with the first user to the second portable electronic device responsive to determining that the portable electronic device is capable of communicating with the second portable electronic device, and to automatically receive one or more network identifiers associated with a second user from the second portable electronic device responsive to determining that the portable electronic device is capable of communicating with the second portable electronic device; and
   location information acquisition logic configured to obtain location information relating to a geographical location at which the one or more network identifiers associated with the second user were received;
   wherein the control logic is further configured to associate the location information with the one or more network identifiers associated with the second user.

2. The portable electronic device of claim 1, further comprising:
   a wireless network interface configured to wirelessly transmit the one or more network identifiers associated with the second user to a server for inclusion in a network contact list associated with the first user.

3. The portable electronic device of claim 2, wherein the wireless network interface is further configured to wirelessly receive the one or more network identifiers associated with the first user.

4. The portable electronic device of claim 1, further comprising:
   a personal computer interface configured to transmit the one or more network identifiers associated with the second user to a personal computer.

5. The portable electronic device of claim 4, wherein the personal computer interface is configured to receive the one or more network identifiers associated with the first user.

6. The portable electronic device of claim 1, further comprising:
   network identifier selection logic configured to select the one or more network identifiers associated with the first user from a plurality of groups of one or more network identifiers associated with the first user responsive to user input.

7. A method for sharing one or more network identifiers, comprising:
   selecting one or more network identifiers associated with a first user from among a set of multiple network identifiers associated with the first user responsive to input from the first user;
   associating an obscuring identifier with the one or more network identifiers associated with the first user;
   providing the obscuring identifier to the first user in a format suitable for conveyance to a second user; and
   granting access to the second user to the one or more network identifiers responsive to receiving both the obscuring identifier from the second user and receiving an authorization message from the first user.

8. The method of claim 7 wherein providing the obscuring identifier to the first user in a format suitable for conveyance to a second user comprises:
   wirelessly transmitting an electronic file to a portable device.

9. The method of claim 7, wherein providing the obscuring identifier to the first user in a format suitable for conveyance to a second user comprises:
   transmitting an electronic file to a personal computer for subsequent downloading to a portable device.

10. The method of claim 7, wherein providing the obscuring identifier to the first user in a format suitable for conveyance to a second user comprises:
    providing the obscuring identifier in a format suitable for printing to a tangible medium.

11. The method of claim 7, wherein granting access to the second user to the one or more network identifiers responsive to receiving both the obscuring identifier from the second user and receiving an authorization message from the first user comprises:
    generating an authorization request message for the first user responsive to receiving the obscuring identifier from the second user; and
    receiving an authorization response message from the first user.

12. A computer program product comprising a non-transitory computer-readable medium having computer program logic recorded thereon for enabling a processing unit to share one or more network identifiers, wherein the computer program logic comprises:
    first means for enabling the processing unit to select one or more network identifiers associated with a first user from among a set of multiple network identifiers associated with the first user responsive to input from the first user;
    second means for enabling the processing unit to associate an obscuring identifier with the one or more network identifiers associated with the first user;
    third means for enabling the processing unit to provide the obscuring identifier to the first user in a format suitable for conveyance to a second user; and
    fourth means for enabling the processing unit to grant access to the second user to the one or more network identifiers responsive to receiving both the obscuring identifier from the second user and receiving an authorization message from the first user.

13. The computer program product of claim 12, wherein the third means comprises means for enabling the processing unit to wirelessly transmit an electronic file to a portable device.

14. The computer program product of claim 12, wherein the third means comprises means for enabling the processing unit to transmit an electronic file to a personal computer for subsequent downloading to a portable device.

15. The computer program product of claim 12, wherein the third means comprises means for enabling the processing unit to provide the obscuring identifier in a format suitable for printing to a tangible medium.

16. The computer program product of claim 12, wherein the fourth means comprises:
    means for enabling the processing unit to generate an authorization request message for the first user responsive to receiving the obscuring identifier from the second user; and
    means for enabling the processing unit to receive an authorization response message from the first user.

* * * * *